April 14, 1970     R. M. CURRIE     3,506,425
METHOD OF MANUFACTURING AUTOMOTIVE GLASS THICKER AT
THE TOP THAN AT THE BOTTOM THEREOF
Original Filed Dec. 10, 1962

ROBERT M. CURRIE
INVENTOR

BY John L. Faulkner
William E. Johnson
ATTORNEYS 3,506,425
METHOD OF MANUFACTURING AUTOMOTIVE GLASS THICKER AT THE TOP THAN AT THE BOTTOM THEREOF
Robert M. Currie, Dearborn, Mich., assignor to Ford Motor Company, Dearborn, Mich., a corporation of Delaware
Continuation of application Ser. No. 243,330, Dec. 10, 1962. This application Aug. 25, 1967, Ser. No. 663,275
Int. Cl. C03b 33/00; C03c 1/00
U.S. Cl. 65—62                                    2 Claims

ABSTRACT OF THE DISCLOSURE

A plurality of bent, automotive windows having a substantially reduced double vision characteristic are manufactured by the following steps. A plurality of glass brackets are formed in such a manner that each bracket has a substantially uniform taper from one edge thereof to an opposing edge thereof. The glass brackets are cut so that the thicker edge of each of the brackets forms the top of the window. Each of the cut brackets is then bent so that the window produced thereby is thicker at the top than at the bottom thereof.

---

This application is a continuation of application S.N. 243,330, filed Dec. 10, 1962, and now abandoned.

BACKGROUND OF THE INVENTION

Light passing through a sheet of glass is refracted whenever the light strikes the glass at other than a perpendicular direction. This is not ordinarily observable in automotive glass installed in a vehicle. In addition, a portion of the light is reflected between the surfaces of the glass to form a secondary image of less intensity than the primary image. As the angle of incidence of the light is increased, the relative brightness of the secondary image increases.

Present day automotive windshields and backlights normally have some vertical curvature or compounding. In addition, in present day automobiles the windshields and some backlights are very substantially inclined from the vertical for appearance and to aid in streamlining the vehicle. As a result, bright objects such as headlights of an approaching vehicle may appear as two or more pairs of lights, the principal image being the brightest set and the secondary and sometimes even a tertiary image appearing above the principal image.

Automotive windshields, and generally also backlights, are manufactured of plate glass which is initially formed with a rough surface and subsequently ground and polished. Plate glass, as usually manufactured, instead of having true parallel faces, may be slightly tapered or wedged. The degree of taper as well as installation angle and radius of curvature will affect transmission of light through the glass, affecting the position of the secondary image.

SUMMARY OF THE INVENTION

According to the method of the present invention, the glass utilized in automotive windows is cut so as to orientate the glass in the windshield or backlight so that the wedge or taper of the glass displaces the secondary image in a direction to counteract the effect of angle of installation and vertical curvature of the windshield, the net result being that the secondary image will coincide more closely with the primary image and not be objectionable under ordinary conditions.

More particular, the method of manufacturing a plurality of bent, automotive glass windows with a substantially reduced double vision characteristic in accordance with the method of this invention comprises the following steps. A plurality of glass brackets are formed in a manner such that each glass bracket has at least one of its surfaces tapered from one edge thereof to an opposing edge thereof whereby the glass is thicker along one edge than along the opposing edge. The sheets of glass are positioned in a glass bending fixture in a manner such that the thicker edge of each of the brackets is located adjacent the portion of the bending fixture designed for forming the top of the bent glass sheet. Thereafter, the glass is heated in the bending fixture to a glass softening temperature whereby the glass bracket is bent to its final shape, which final shape is such that the top of the glass window is thicker than the bottom of the window.

DESCRIPTION OF THE PREFERRED EMBODIMENT

Figure 1:
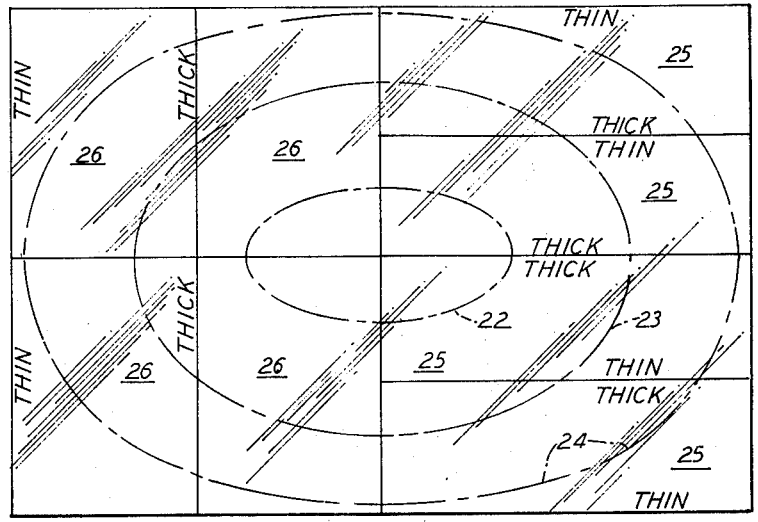
FIGURE 1 is a layout diagram of a glass sheet indicating the cutting pattern for cutting rectangular brackets for windshields and backlights from a single large sheet of plate glass, and also indicating generally the relative thickness of the glass at various portions of the sheet.

The degree of separation of primary and secondary images of an object viewed through a piece of automobile glass will be governed in part by the degree of curvature of the glass and the angle of installation of the glass in the vehicle, as well as the height of the eye of the observer. The nearer perpendicular to the glass surface the light strikes an automotive windshield or backlight, the less reflection there will be and the weaker the secondary image in relation to the primary image. It has been found that in present day automotive windshields and backlights, the curvature in a horizontal direction upon a vertical axis does not cause severe distortion or double vision of objects viewed through the central zone. Due to installation angle as well as vertical curvature (about a horizontal axis) at the top portion of the windshield or backlight where the light may strike the glass at a sharp angle, there will be a substantial displacement of the secondary image from the primary image. The displacement of the primary and secondary images will be less in the middle and lower zones of the glass. As the angle of incidence from the perpendicular increases, the brightness of the primary image diminishes and the brightness of the secondary image increases. At night, headlights of approaching cars may show as two or more pairs of lights. In daytime driving, however, the secondary image is usually not noticed.

The method of this invention takes advantage of a characteristic of ground plate glass called wedge in reducing the double vision effects of automotive windshield glass. More particularly, it has been found that if the wedge of the glass sheet is orientated in the windshield or other automotive glass area in such a manner that the glass at the top of the window is thicker than the glass at the bottom of the particular window, the effect of double vision is reduced. More particularly, it has been observed that the primary and secondary images are not as perceptible to the eye as such images would be if the glass sheet was installed in a different manner, that is, if the wedge or thicker portion of the sheet was at the bottom of the window rather than at the top.

To practice the method of this invention and thereby to produce automotive glass which reduces the double vision characteristics of such glass, glass brackets are cut from a large sheet of glass such as a sheet of plate glass.

Plate glass usually is manufactured by passing the glass between a pair of forming rolls to form a rough plate which first is annealed and then is cut to form rectangular sheets which may be about 10 feet by 15 feet in size. The rough sheets are then cemeted to larger grinding tables which transport the sheets beneath rotating grinding and polishing heads of a large grinding machine whereby the sheets are ground and polished. The two faces of the glass are successively ground and polished, the glass being raised from the table and turned over after the polishing of one face has been completed.

Under some manufacturing conditions, the large sheets of plate glass will have a maximum thickness in the region of the center of the sheet and will taper outwardly toward the edges thereof. FIGURE 1 indicates a finished sheet 21 of plate glass on which generally oval shaped lines 22, 23 and 24 passing through areas of equal thickness have been drawn. The taper from the center to the edges of such a sheet may be as much as 0.018 to 0.019 of an inch. The pattern of gradation from maximum thickness at the center and tapered toward the edges is typical, although the regularity and degree of taper may vary from sheet to sheet.

The sheet 21 is cut to form a series of rectangular brackets 25 and 26 from which automobile windows such as windshields and backlights are manufactured. It will be noted that each of the brackets 25, and some of the brackets 26, have a side edge toward the center of the glass which is thicker than the opposite side edge. The thick and thin edges of the bracket have been indicated in FIGURE 1. While the thick edge of the bracket is not of uniform thickness throughout its length, it is generally somewhat thicker than the corresponding portion of the opposite side edge, the bracket tapering generally uniformly from the thick side edge to the thin side edge.

Figure 2:
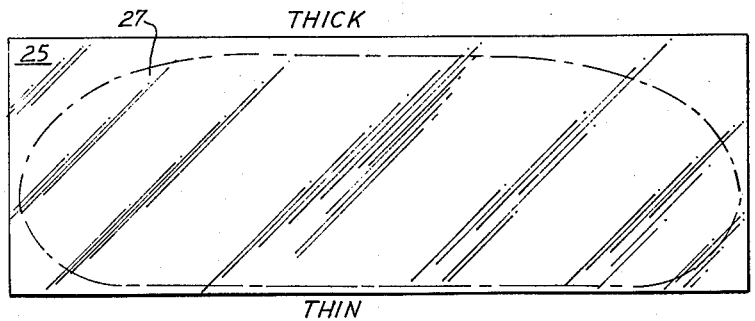
FIGURE 2 is a layout indicating the cutting pattern of a windshield template in accordance with the present invention.

After cutting the large sheets 21, the brackets 25 and 26 are removed and stacked on racks, ready to be cut into template form for bending. By noting the position of the bracket in the large sheet of glass, the thicker side edge can be identified without actually measuring it. Preferably, all of the brackets are orientated in the racks so that the thickest side edge lies along a common side of the stack. Then, in the cutting of the template 27 (see FIGURE 2) from the bracket 25, the thicker edge of the glass may be orientated in the template cutting machine so that the thicker edge will lie along the top portion of the glass when installed in the vehicle. The templates generally are not symmetrical along the horizontal center line so that once the bracket is positioned for cutting the template form with the thicker edge of the bracket positioned to form the top of the windshield or backlight, there is no danger of the template subsequently being reversed.

After the template 27 is cut, the glass is subsequently bent, usually on glass bending fixtures which may be of the general type disclosed in U.S. Patent 2,720,729. In the manufacture of tempered safety glass backlights, a single template is placed on the fixture. In forming a laminated safety glass windshield, a pair of glass templates are placed on the bending fixture, one template superimposed on the other, and are bent together. Assuming that brackets and templates are up to 0.006 inch thicker at the top than at the bottom, a tempered safety glass backlight will be correspondingly thicker at the top and a laminated safety glass windshield will be up to 0.012 inch thicker at the top inasmuch as it is made of two laminations of glass.

By orientating the taper or wedge of the glass in the above described manner, that is, by assuring that each sheet of glass is cut and then mounted in the bending fixture in a manner such that the thicker portion of the glass is at the top of the bending fixture or the portion of the bending fixture that will define the top of the formed glass window, the tendency toward double vision and secondary images is reduced or totally eliminated.

The present invention produces glass which may be utilized in windshields of automobiles, which glass successfully employs the wedge of the glass to counteract displacement of secondary images due to the angle of installation and vertical curvature of the glass.

What is claimed is:

1. The method of manufacturing a plurality of bent automotive glass windows having a substantially reduced double vision characteristic, which method comprises the steps of: forming a plurality of glass brackets in a manner such that each glass bracket has a uniform taper from one edge thereof to an opposing edge thereof whereby the glass is thicker along one edge than along said opposing edge; pattern cutting each of said plurality of brackets of glass so that said thicker edge forms the top of each of said cut glass brackets; and bending each of said plurality of cut glass brackets to maintain the top of said cut glass brackets thicker than the bottom thereof.

2. The method of manufacturing a plurality of bent, laminated automotive windshields having a substantially reduced double vision characteristic, which method comprises the steps of: cutting a plurality of brackets to have a thicker edge and a thinner edge from a large sheet of glass, said large sheet of glass having a slight substantially uniform taper from its central portion toward its edges; pattern cutting each of said plurality of brackets only in such a manner that the thicker edge of each of said brackets forms the top of the final product; positioning two superimposed, pattern cut glass brackets in a bending fixture at a time with the thicker edge of each of said cut glass brackets at the top of the final product; bending said two cut glass brackets to maintain the top of said cut glass bracket thicker than the bottom thereof; interposing a sheet of plastic; laminating said two cut glass brackets with said interposed sheet of plastic; and repeating the positioning, bending, interposing, and laminating steps for pairs of the plurality of cut brackets of glass.

References Cited

UNITED STATES PATENTS

| | | | |
|---|---|---|---|
| 2,827,739 | 3/1958 | Atkeson | 65—24 |
| 2,959,507 | 11/1960 | Long | 156—101 |

S. LEON BASHORE, Primary Examiner

E. R. FREEDMAN, Assistant Examiner

U.S. Cl. X.R.

65—24, 42, 54, 55, 61, 105, 106; 83—7; 156—101, 102